United States Patent [19]
Harris

[11] 3,723,960
[45] Mar. 27, 1973

[54] AUTOMATIC TARGETING SYSTEM
[75] Inventor: Jack R. Harris, Holland, Pa.
[73] Assignee: The United States of America as represented by the Secretary of the Navy
[22] Filed: Feb. 26, 1971
[21] Appl. No.: 119,246

[52] U.S. Cl.............340/6 R, 340/16 R, 343/112 C
[51] Int. Cl................................................G01s 5/18
[58] Field of Search..340/6 R, 16 R; 343/112 R, 112 C;
235/150.27, 150.271, 150.272

[56] References Cited
UNITED STATES PATENTS
2,940,076  6/1960  Bissett et al.................343/112 R
2,913,720  11/1959  Zabb et al....................343/112 C FOREIGN PATENTS OR APPLICATIONS
849,643  9/1960  Great Britain..............343/112 C Primary Examiner—Richard A. Farley
Attorney—R. S. Sciascia and Henry Hansen

[57] ABSTRACT

Method and apparatus for locating a target utilizing three or more acoustic sensors connected by a radio link to a general purpose digital computer. The respective sensor outputs are correlated in order to identify a common acoustic source; then the times of arrival of a discrete sound emanated by the source are compared for determining the coordinates of the source. The source coordinates are then displayed on a plan position indicator.

7 Claims, 5 Drawing Figures

Patented March 27, 1973

INVENTOR.
JACK R. HARRIS

BY

ATTORNEY

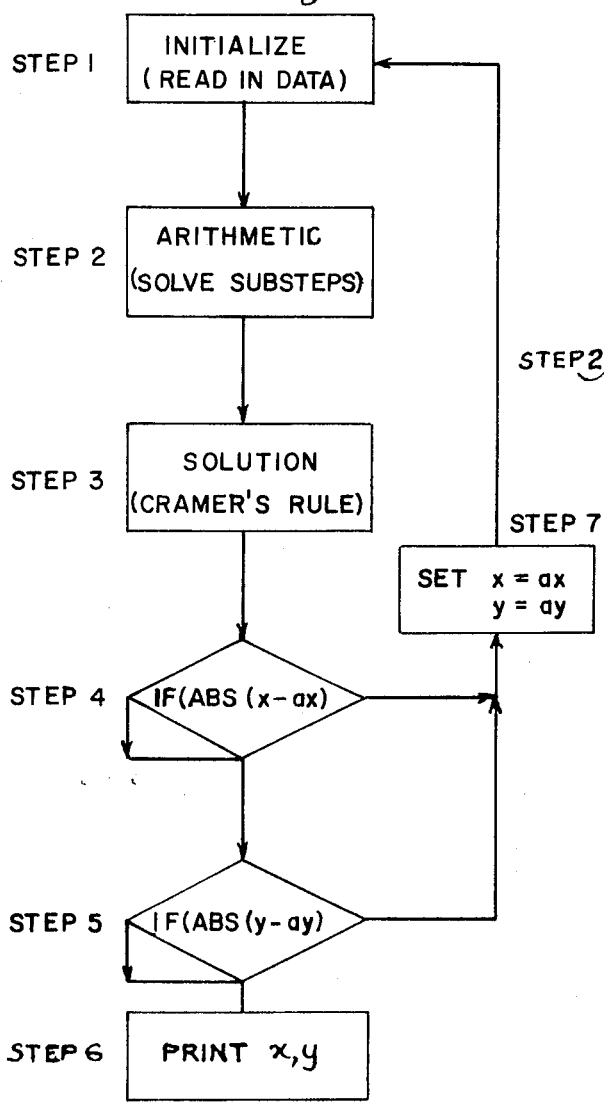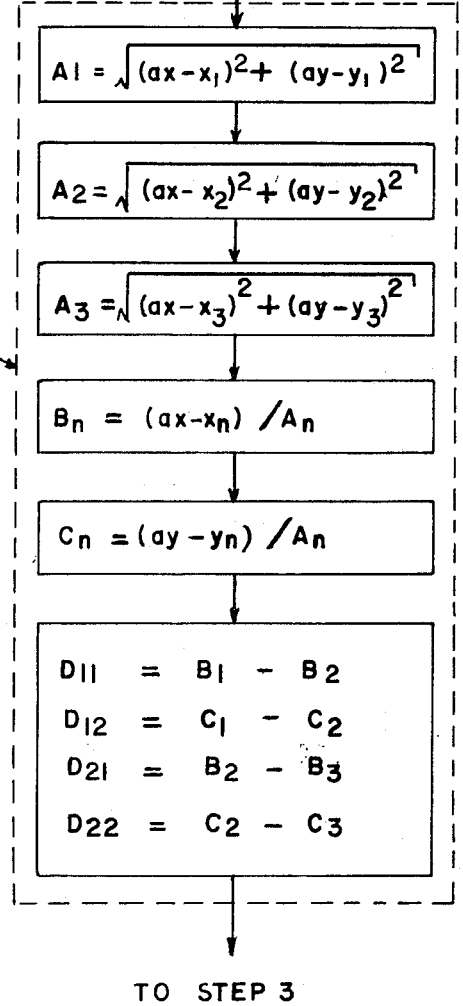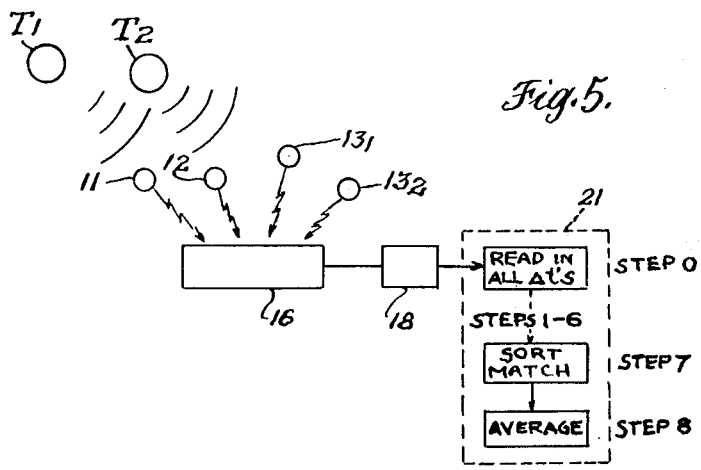

AUTOMATIC TARGETING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to target location method and apparatus, and more particularly to such method and apparatus using remote sensors deployed to pick up radiated energy from the target.

The difficulties of target acquisition and the determination of its exact coordinates under field conditions are well known. The determination of the coordinates of a target that either radiates or reflects acoustic energy is particularly difficult when the acquisition system includes sensors deployed at remote distances from known coordinates. These systems often experience difficulty in determining the true coordinates of the sensors, thus any target acquisition referenced to the sensors is uncertain. The problem is even more amplified in applications of deployed sonobuoy sensing systems where each sonobuoy is not only subject to errors of deployment but is also exposed to perturbations caused by random sea currents. Typically the sensing techniques which determine target location are based on the energy radiated or reflected by the target and in most cases range is determined on the basis of interpreting the time various sensors intercept a discrete signal emanating from the target. These techniques are based on the propagation speed of a signal in a given medium. Typical approaches to the acquisition problem are resolved by either vectoring and referencing a sensor, or by referencing a multiplicity of omnidirectional sensors and comparing the times at which they intercept a target signal. The latter technique requires redundancy in the sensor field in order to resolve ambiguities. Thus, extensive effort has been expended in the past on the means for accurately referencing remote sensors. At the same time, in the interest of simplicity, a typical sensor field is generally composed of three or more passive sensors thus the distance to the target with respect to any of the sensors is never directly measurable. The result is that the only means of establishing target coordinates is indirect, allowing for ambiguities or requiring an excessive number of sensors. Specifically the ambiguity arises out of the characteristic hyperbolic patterns formed by lines of constant time of intercept difference between each pair of sensors wherein the hyperbolas of one sensor pair intersect at more than one point with the hyperbolas of a second sensor pair. A third sensor pair comparison is necessary to resolve the ambiguity. There still remains the possibility of ambiguous target location in a three sensor pair comparison if the sensors are all in a straight line. Accordingly, prior targeting techniques necessarily include human intervention in the course of or during any automated target locating operation where a decision is made as to which option of the ambiguity is the true target.

SUMMARY OF THE INVENTION

Accordingly it is a general purpose and object of the present invention to provide method and apparatus for displaying target location without human intervention. Other objects of the present invention are to provide method and apparatus for locating multiple targets emitting similar signals, locating targets against known references and computing indirectly target location by linear computation.

These and other objects are accomplished within the present invention by combining remote sensors, the number of which is one greater than the number of coordinates to be determined, together with a digital computer programmed to operate along novel mathematical algorithms inventively arranged to be solved in linear form. Iterative loops around the algorithms correct the coordinate locations of the sensors and converge on the target coordinates. The target coordinates are then encoded into a display format.

BRIEF DESCRIPTION OF THE DRAWING

FIG. 3 is a logic flow chart of computations performed by the system of FIG. 2;

FIG. 4 is a more detailed flow chart of step 2 in FIG. 3; and

FIG. 5 is a graphical representation and flow chart of another embodiment according to the invention.

DESCRIPTION OF THE PREFERRED EMBODIMENTS

Figure 1:
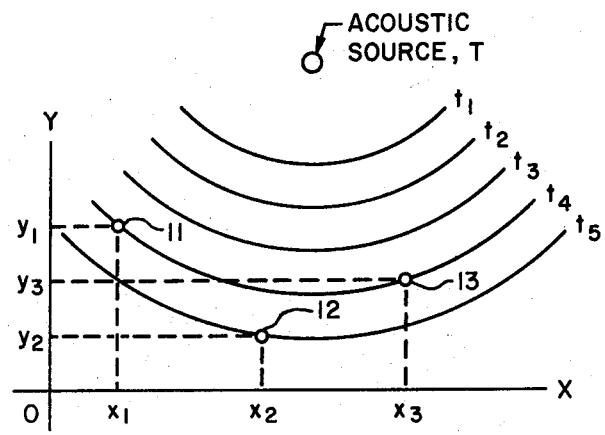
FIG. 1 graphically illustrates an acoustic source radiating energy in a field of three transducers.

Referring to FIG. 1 an acoustic source or target T is shown radiating continuous analog acoustic signal, one discrete element of which is shown propagating radially with time $t_1$ through $t_5$. Three acoustic sensors 11, 12 and 13, respectively, are shown located at their estimated coordinates $y_1x_1$, $y_2x_2$, and $y_3x_3$. Sensors 11 and 13 intercept the radiated element at time $t_4$, and sensor 12 at time $t_5$.

Figure 2:
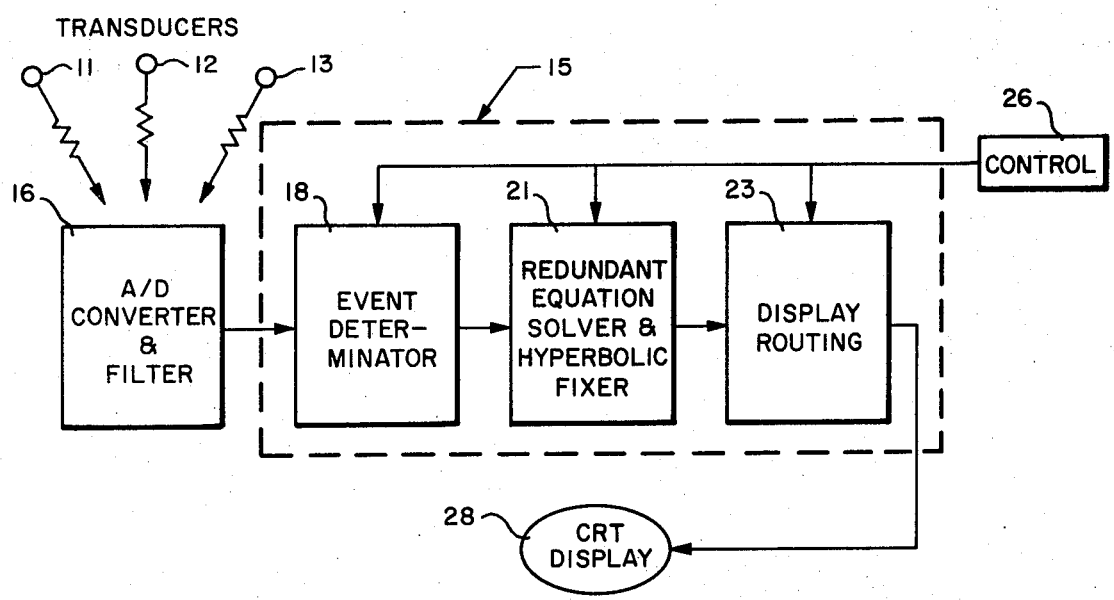
FIG. 2 is a block diagram of the automatic targeting system according to the invention.

As shown in FIG. 2 the sensors are connected by a radio link to an analog-to-digital converter 16 producing parallel outputs indicative of the amplitudes of the respective sensor signals. The output of converter 16 is fed to an event determinator 18 which selects the particular element registered by the sensors to obtain a time difference, $\Delta t$, such as $t_5 - t_4$. The $\Delta t$ is determined within the event determinator 18 according to well-known techniques in the art. For example, for a continuous signal from source T, a $\Delta t$ may be calculated within determinator 18 programmed with a correlation algorithm such as:

$$K = \frac{1}{2T} \int_{-T}^{T} f(\tau) g(\tau + \Delta t) d\tau \qquad (1)$$

where $f(\tau)$ is the time-history of the acoustic sound transmitted by sensor 12. The $\Delta t$ providing the highest reading of $K$ is therefore an interval $\Delta t_{12}$ fed to the redundant equation solver 21 algorithm corresponding to $t_5 - t_4$. The value of $K$ corresponding to various $\Delta t$ increments is sorted according to well-known sort techniques, such as rank-ordering, thus the maximum value thereof is determined.

The above technique is not necessary for discrete or impulsive acoustic signals such as artillery or other explosions. If the signal is sufficiently distinct from the background noise it can be isolated by filtering alone. Accordingly, it is contemplated within the present invention to include a filter in the analog-to-digital converter 16. Thus a $\Delta t$ can be obtained either by correlation or simply by comparison of filtered signals providing the independent variables necessary for the solution of the redundant equations. A $\Delta t$ thus selected is fed to a redundant equation solver 21 wherein the original estimates of coordinates $y_1$ through $y_3$ and $x_1$ through $x_3$ are corrected and the $x, y$ location of target $T$ is calculated as described hereinbelow. The output from solver 21 is fed to a display unit 23 where it is converted into code according to generally well-known methods of translation to produce an output on a cathode ray tube display 28. Determinator 18, solver 21 and display unit 23 are shown separated functionally, however, in practice it is contemplated that these elements comprise separate routines within a single general purpose computer 15. Only three sensors 11, 12 and 13 are included in this embodiment, these being the minimum number of sensors necessary to complete an unambiguous two-dimensional targeting solution.

Specifically the coordinates of the source T are calculated by comparing the intercept times corresponding to each sensor 11, 12 and 13. Thus, a time difference, $\Delta t_{12}$, corresponding to the radial propagation interval between sensor 11 and sensor 12 at a given propagation velocity V is converted into radial distance 66 $R_{12}$ by the relationship $$\Delta R_{12} = \Delta t_{12}(V) \tag{2}$$

and corresponds to the difference in the radial dimensions from source $T$ to the respective sensors. The radial dimension between $T$ and sensors 11 and 12 can be also expressed in terms of $x$ and $y$ coordinates resulting in the relationship $$\Delta R_{12} = \Delta t_{12}(V) = \sqrt{(x-x_1)^2+(y-y_1)^2} - \sqrt{(x-x_2)^2+(y-y_2)^2} \tag{3}$$

wherein $x =$ the $x$ coordinate of source $T$
and $y =$ the $y$ coordinate of source $T$. The resulting relationship defines a family of hyperbolas symmetric about the vertical bisector between sensors 11 and 12, each hyperbola corresponding to the complementing $x$ and $y$ coordinates that satisfy a given $\Delta t_{12}$. Similarly for the sensor 12 and 13 pair another set of hyperbolas is formed, thus any solution locating the $x$ and $y$ coordinates of source $T$ is formed about the intersections of two hyperbolas and is ambiguous due to the possibility of having two intersection points.

Accordingly, in order to provide an on-line solution that is not ambiguous in a field situation where generally the approximate location of the source $T$ is known the equation solver 21 is programmed to expand equation (3) according to Taylor series expansion theorem following the general algorithm in its expanded form $$\frac{[a_q]-[Q_m]}{[A_n]} = [Q_{mm}] \tag{4}$$

where $a_q$ is the matrix corresponding to the first estimate of source $T$ location and the $Q_{mm}$ matrix is solved for $x$ and $y$ by Cramer's rule. By this technique the original non-linear equation (3) is reduced to a linear form conserving computation equipment and providing an unambiguous result.

Referring to FIGS. 3 and 4, the operations within the redundant equation solver 21 are arranged according to the arithmetic steps 1 through 6 of FIG. 3 where step 2, as expanded in FIG. 4, represents the left-hand side of the solution according to Cramer's rule performed in step 3. Specifically step 3 solves for x and y according to the algorithm $$\frac{\begin{bmatrix}D_{11} & D_{12}\\D_{21} & D_{22}\end{bmatrix}\begin{Bmatrix}x\\y\end{Bmatrix}}{\begin{vmatrix}D_{11} & D_{12}\\D_{21} & D_{22}\end{vmatrix}} = \frac{[Q_{mm}]\begin{Bmatrix}x\\y\end{Bmatrix}}{|Q_{mm}|} = \begin{Bmatrix}\Delta t_{12}V+C_{12}\\\Delta t_{23}V+C_{23}\end{Bmatrix} \tag{5}$$

where $D_{11}, D_{12}, D_{21}$ and $D_{22}$ are solved in step 2 of FIG. 4 and $C_{12}$ and $C_{13}$ are formed according to the following relationships:

$$C_{12} = A_1 + A_2 + a_x(B_1-B_2) + a_y(C_1-C_2) \tag{6}$$

$$C_{23} = A_2 + A_3 + a_x(B_2-B_3) + a_y(C_2-C_3) \tag{7}$$

The calculated $x$ and $y$ results are then compared in steps 4 and 5, respectively, against a predetermined tolerance and if found outside the tolerance new values of $a_x$ and $a_y$ are initialized corresponding to the last calculated $x$ and $y$, thus an iteration loop is formed converging on the true values of $x$ and $y$.

Similarly, by referencing to a known source $x$ and $y$, a $\Delta_x$ and $\Delta_y$ can be obtained by representing the bulk error of the sensor 11, 12 and 13 field. Error correction of this kind does not adequately compensate for relative perturbations between sensors. Accordingly, by referencing to four discrete known sources each sensor pair can be accurately located. The arithmetic is identical to that shown in FIG. 4 and described in equations (2) – (7) for each sensor. Thus the iteration must necessarily be closed around $x_1, y_1, x_2$ and $y_2$ in order to locate a sensor pair, e.g., sensors 11 and 12.

As shown in FIG. 5 another embodiment of the present invention includes an additional routine which, in combination with a sensor field consisting of four sensors 11, 12, 13$_1$ and 13$_2$, sorts and reduces the locations of multiple sources shown at $T_1$ and $T_2$, each of which is generating identical or indistinguishable signals such as explosions. In this case the measurement of $\Delta t$ can form between alternate sources resulting in false solutions. Accordingly, it is contemplated within the present invention to include a comparison between sensor sets 11, 12 and 13$_1$, and 11, 12 and 13$_2$ simultaneously receiving discrete signals from two sources $T_1$ and $T_2$. Each sensor set produces both true source coordinates corresponding to the $\Delta t$'s generated singularly by one source $T_1$ or $T_2$ and false coordinates resulting from $\Delta t$'s formed by various other combinations between source $T_1$ and $T_2$ signals. Thus, in order to select the true coordinates of source $T_1$ and $T_2$, a sort routine is included consisting of steps 0, 7 and 8 forming an outside loop around steps 1–6 of FIG. 3, wherein the routine matches all the solutions generated both from true and false $\Delta t$'s and stores those that are repetitive with respect to each other within a given class interval. In order to complete a selection of two sources, two separate sensor fields consisting of a minimum of three sensors is necessary. As shown this can be accomplished by combining two common sensors within each field plus an additional unique sensor $13_1$ and $13_2$, respectively, thus the invention is capable of multiple source or target identification with a minimum of four sensors.

Specifically the routine shown in FIG. 5 forms an outer loop around steps 1-6 of FIG. 3. Accordingly, initialization in the form of first approximation, $a_x$ and $a_y$, of the respective locations of sources $T_1$ and $T_2$ is necessary as discussed above. In this manner twelve source coordinate solutions are generated, any three of which can match to form the solution of one of the sources. As stated previously the routine described in FIG. 3 forms an iteration loop closing within a specified error which, together with the errors in estimating the propagation velocity V and sensor coordinate errors, requires that certain tolerances or class intervals be allowed within which a match is made, wherein the class interval is determined according to well-known means of tolerance addition. The individual coordinates involved in each match are therefore not identical and consequently are averaged in step 8.

In operation the targeting solution is initialized by reading in the estimates of the source T coordinates $a_x$ and $a_y$ through either a keyboard or any other well-known means of entering a general purpose computer 15 from control 26. The invention then calculates the x and y coordinates of the source T with reference to the coordinates of sensors 11, 12 and 13. Accordingly, x and y accuracy is predicated on the accuracy of location of the sensor field and where the sensor locations are in question the same basic algorithms used in locating the source T are used to correct the sensor coordinates against four known sources. Thus a source T is referenced against a sensor field which is, in turn, referenced against known sources.

Some of the many advantages of the present invention should now be readily apparent. The invention provides automatic identification of the location of sound generating sources, together with a display of the coordinates thereof, requiring minimal human intervention of the process. The only intervention necessary is the prerequisite of the first order estimate of the source location in order to initialize the iteration loop. Accordingly, given a situation where the desired target area is generally ascertained the invention can be placed in an automated mode for initiating a tactical response.

Obviously many modifications and variations of the present invention are possible in the light of the above teaching. It is therefore to be understood that within the scope of the appended claims the invention may be practiced otherwise than as specifically described.

What is claimed is:

1. Apparatus for locating an acoustic source with respect to a set of coordinates wherein the approximate location is known, comprising, in combination:

omnidirectional sensors, the number of which is greater than the number of coordinates in the set, spaced apart in any known arrangement with respect to the coordinates, each sensor generating an output signal indicative of the amplitude of the sound detected thereat;

control means adapted to receive and store a first order estimate of the coordinates of the approximate location of the acoustic source for producing encoded control signals;

determinator means operatively connected to receive said sensor output signals and said control signals for correlating one event of sound detected at respective times by said sensors and producing output signals indicative of the arrival time differences of the event at each combination of two sensors; and solver means connected to receive said determinator means output signals and said control signals, including a hyperbolic fixer coded to expand into linear form a set of hyperbolic relationships, each relationship corresponding to respective ones of said determinator output signals, and a simultaneous equation solver arranged to accept respective ones of said expanded relationships in an iterative solution form initialized according to said control signals, for producing output signals indicative of a close approximation of the actual coordinate location of the acoustic source.

2. Apparatus for locating an acoustic source with respect to a set of two orthogonal coordinates wherein the approximate location is known, comprising, in combination:

omnidirectional sensors including first, second and third sensors, spaced apart in any known arrangement with respect to the coordinates, each sensor generating an output signal indicative of the amplitude of the sound detected thereat;

control means adapted to receive and store a first order estimate of the coordinates of the approximate location of the acoustic source for producing encoded control signals;

determinator means operatively connected to receive said sensor output signals and said control signals for correlating one event of sound detected at respective times by said sensors and producing output signals indicative of the arrival time differences of the event at each combination of two sensors;

solver means connected to receive said determinator means output signals and said control signals and arranged to calculate the coordinate locations x and y of the source according to the matrix relationship $$\begin{bmatrix} D_{11} & D_{12} \\ D_{21} & D_{22} \end{bmatrix} \begin{Bmatrix} x \\ y \end{Bmatrix} = \begin{Bmatrix} \Delta t_{12}(v) + C_{12} \\ \Delta t_{23}(v) + C_{23} \end{Bmatrix}$$

wherein $$D_{11} = \left\{ \frac{a_x - x_1}{\sqrt{(X-x_1)^2 + (Y-y_1)^2}} \right\} - \left\{ \frac{a_x - x_2}{\sqrt{(X-x_2)^2 + (Y-y_2)^2}} \right\}$$

$$D_{12} = \left\{ \frac{a_y - y_1}{\sqrt{(X-x_1)^2 + (Y-y_1)^2}} \right\} - \left\{ \frac{a_y - y_2}{\sqrt{(X-x_2)^2 + (Y-y_2)^2}} \right\}$$

$$D_{21} = \left\{ \frac{a_x - x_2}{\sqrt{(X-x_2)^2 + (Y-y_2)^2}} \right\} - \left\{ \frac{a_x - x_3}{\sqrt{(X-x_3)^2 + (Y-y_3)^2}} \right\}$$

$$D_{22} = \left\{ \frac{a_y - y_2}{\sqrt{(X-x_2)^2 + (Y-y_2)^2}} \right\} - \left\{ \frac{a_y - y_3}{\sqrt{(X-x_3)^2 + (Y-y_3)^2}} \right\}$$

$\Delta t_{12}$ = time interval between the arrival times of said first and second sensors $\Delta t_{23}$ = time interval between the arrival times of said second and third sensors $C_{12} = \sqrt{(X-x_1)^2+(Y-y_1)^2} + \sqrt{(X-X_2)^2+(Y-y_2)^2} + a_x(D_{11}) + a_y(D_{12})$ $C_{23} = \sqrt{(X-x_2)^2+(Y-y_2)^2} + \sqrt{(X-X_3)^2+(Y-y_3)^2} + a_x(D_{21}) + a_y(D_{22})$ V = velocity of propagation, and further wherein $a_x, a_y$ = coordinates of said first order estimate control signals $x_1, y_1$ = coordinates of said first sensor $x_2, y_2$ = coordinates of said second sensor $x_3, y_3$ = coordinates of said third sensor X, Y = coordinates of said acoustic source said relationship being solved by Cramer's rule and iteration loops closing between X and $a_x$, and Y and $a_y$ for producing output signals indicative of a close approximation of the actual coordinate location of the acoustic source; and display means connected to receive the solver means output signals for producing a visual display thereof.

3. A method for locating an acoustic source with respect to a set of coordinates comprising the steps of:

sensing the signal emanated by the source at several locations within the coordinates, the number of locations being greater than the number of coordinates;

correlating the sensed signals at each location to establish a time interval between the arrival of one sound event sensed respectively at each combination of two locations;

estimating the location of said source;

computing a close approximate of the actual coordinate location of the source by expanding the geometric simultaneous equations of the form $\Delta t_{mn}(V) = \Delta R_{mn} = \sqrt{(X-X_m)^2+(Y-Y_m)^2} - \sqrt{(X-X_n)^2+(Y-Y_n)^2}$ wherein $\Delta t_{mn}$ = time of arrival between sensor m and sensor n $\Delta R_{mn}$ = radial increment between sensor m and sensor n centered at the source $X_m, Y_m$ = x and y coordinates of sensor m $X_n, Y_n$ = x and y coordinates of sensor n X, Y = x and y coordinates of the source V = velocity of propagation according to Taylor series expansion the initial value thereof estimated to be $a_x$ and $a_y$;

solving the simultaneous equations by Cramer's rule; and iterating until converged on the Taylor series by replacing the estimated location with the last calculated x and y locations.

4. An apparatus for locating two or more acoustic sources with respect to a set of coordinates wherein the approximate locations are known, each source emanating identical signals, comprising in combination:

omnidirectional sensors the number of which is two greater than the number of the coordinates in the set, spaced apart in any known arrangement with respect to the coordinates, each sensor generating an output signal indicative of the amplitude of the sound detected thereat;

control means adapted to receive and store a first order estimate of the coordinates of the approximate locations of the acoustic sources for producing encoded control signals;

determinator means operatively connected to receive said sensor output signals and said control signals for producing output signals indicative of the time difference between any two sensors detecting a sound event emanated by any one of said sources;

solver means connected to receive said determinator means output signals and said control signals for producing output signals indicative of close approximations of all possible coordinate locations of the acoustic sources; and sorting means connected to receive said solver means output signals and said control signals for sorting said signals into like coordinate groups and producing an averaged signal corresponding to each group containing three or more solver means output signals indicative of the true close approximations of the actual coordinate locations of the acoustic sources.

5. An apparatus for locating two or more acoustic sources according to claim 4, further comprising:

said solver means including a hyperbolic fixer coded to expand into linear form a set of hyperbolic relationships, each relationship corresponding to respective ones of said determinator output signals, and a simultaneous equation solver arranged to accept respective ones of said expanded relationships in an iterative solution form initialized according to said control signals.

6. An apparatus for locating two or more acoustic sources according to claim 5, further comprising:

display means connected to receive said coordinate outputs for producing a visual display thereof.

7. A method for locating two or more identical acoustic sources with respect to a set of coordinates comprising the steps of:

sensing the signals emanated by said sources at several locations the number thereof being two greater than the number of said coordinates;

correlating the sensed signals at each location to establish a time interval between the arrival of one sound event sensed respectively at each combination of two locations;

estimating the location of said source;

computing a close approximate of the actual coordinate location of the source by expanding the geometric simultaneous equations of the form $\Delta t_{mn}(V) = \Delta R_{mn} = \sqrt{(X-X_m)^2+(Y-Y_m)^2} - \sqrt{(X-X_n)^2+(Y-Y_n)^2}$ wherein $\Delta t_{mn}$ = time of arrival between sensor m and sensor n $\Delta R_{mn}$ = radial increment between sensor m and sensor n centered at the source $X_m, Y_m$ = x and y coordinates of sensor m $X_n, Y_n$ = x and y coordinates of sensor n X, Y = x and y coordinates of the source V = velocity of propagation according to Taylor series expansion the initial value thereof estimated to be $a_x$ and $a_y$;

solving the simultaneous equations by Cramer's rule;

iterating until converged on the Taylor series by replacing the estimated location with the last calculated x and y locations;

sorting the converged $x$ and $y$ locations according to like coordinate groups; and
displaying groups containing three or more locations.

* * * * *